(12) United States Patent
Erikstrup et al.

(10) Patent No.: US 7,794,676 B2
(45) Date of Patent: Sep. 14, 2010

(54) REACTOR FOR A CATALYTIC CONVERSION REACTION

(75) Inventors: Niels Erikstrup, Frederiksberg (DK); Søren Gyde Thomsen, Lyngby (DK); Michael Boe, Klampenborg (DK)

(73) Assignee: Haldor Topsoe A/S, Lyngby (DK)

( * ) Notice: Subject to any disclaimer, the term of this patent is extended or adjusted under 35 U.S.C. 154(b) by 627 days.

(21) Appl. No.: 11/792,289

(22) PCT Filed: Dec. 12, 2005

(86) PCT No.: PCT/EP2005/013284

§ 371 (c)(1), (2), (4) Date: Jun. 5, 2007

(87) PCT Pub. No.: WO2006/063754

PCT Pub. Date: Jun. 22, 2006

(65) Prior Publication Data

US 2007/0264177 A1 Nov. 15, 2007

(30) Foreign Application Priority Data

Dec. 17, 2004 (DK) .............................. 2004 01951

(51) Int. Cl.
*B01J 8/44* (2006.01)
*B01J 8/02* (2006.01)
*B01J 10/00* (2006.01)
*B01J 12/00* (2006.01)
*B01J 7/02* (2006.01)
*B01J 35/02* (2006.01)
*B01J 10/02* (2006.01)
*B01J 12/02* (2006.01)
*B01J 14/00* (2006.01)
*B01J 19/00* (2006.01)
*F28D 7/00* (2006.01)

(52) U.S. Cl. ...................... 422/311; 422/129; 422/200; 422/211; 422/239

(58) Field of Classification Search ................. 422/129, 422/200, 211, 239, 311
See application file for complete search history.

(56) References Cited

U.S. PATENT DOCUMENTS

| 3,547,188 | A | * | 12/1970 | Kuhnlein | 165/109.1 |
| 4,195,064 | A |   | 3/1980  | Betteken et al. | |
| 4,226,830 | A | * | 10/1980 | Davis | 422/143 |
| 4,743,578 | A |   | 5/1988  | Davidson et al. | |
| 4,863,699 | A | * | 9/1989  | Shaw et al. | 422/143 |
| 5,112,578 | A | * | 5/1992  | Murayama et al. | 422/197 |
| 5,399,321 | A | * | 3/1995  | Sosna et al. | 422/197 |

FOREIGN PATENT DOCUMENTS

WO WO-00/40329 7/2000

* cited by examiner

*Primary Examiner*—Walter D Griffin
*Assistant Examiner*—Natasha Young
(74) *Attorney, Agent, or Firm*—Dickstein Shapiro LLP

(57) ABSTRACT

Reactor for a catalytic conversion reaction comprising within a catalyst housing a perforated catalyst support plate supporting a catalyst bed, the perforated catalyst support plate being supported by a plurality of elongated support elements, and catalyst particles in the catalyst bed being placed outside the elongated support elements, the perforated catalyst support plate being attached to the lower ends of the elongated support elements, the perforated catalyst support plate being divided into a plurality of perforated catalyst support plate segments, at least one perforated catalyst support plate segment being supported by an elongated support element.

8 Claims, 7 Drawing Sheets

REACTOR FOR A CATALYTIC CONVERSION REACTION

The invention relates to a catalytic reactor that is constructed to reduce deformation and rupture of the reactor internals. In particular it relates to a catalytic reactor with an improved catalyst housing.

BACKGROUND OF THE INVENTION

In heterogeneous chemical reactions the chemical reaction is often catalysed by solid catalyst particles. These catalyst particles are typically located in catalyst beds, and during passage of a reactive fluid through the catalyst bed, a chemical reaction takes place, thereby converting the reactive fluid into the desired product or mixture of products having a chemical composition different from that of the reactive fluid.

The inner contents of a reactor are known as reactor internals. The catalyst bed is kept in position in the reactor by reactor internals which allow fluid passage to and from the catalyst particles. This is commonly done by perforating the reactor internals in contact with the catalyst particles. The nature of the perforation determines the fluid flow pattern inside the catalyst bed.

The reactor internals for keeping the catalyst bed in position are typically a catalyst support plate supported along its edges and/or on the free side opposite the catalyst side. In some cases it is not feasible to support the catalyst support plate on this free side, as for example is the case when the catalyst particles and the catalyst support plate undergo large movement due to thermal expansion of the internals.

The catalyst bed can typically have a free upper surface and a bottom surface supported by a horizontal catalyst support plate with perforations. The catalyst bed is kept in place by the vertical non-perforated walls of the catalyst housing and by the perforated catalyst support plate. Gas then enters the catalyst bed from the free upper surface side and leaves the catalyst bed through the perforated catalyst support plate at the bottom of the catalyst bed. The catalyst support plate is fixed along its edge to the vertical catalyst housing wall and is typically not supported on its free side from below. When the reactor is heated up, thermal expansion of the catalyst bed and the vertical walls of the catalyst housing or other reactor internals cause a deformation of the catalyst bed and the reactor internals in a downward axial direction.

During passage of the reactive fluid across the catalyst bed and catalyst support plate, the reactive fluid experiences a pressure drop and this, combined with the weight of the catalyst particles on the catalyst plate, can cause deformation of the catalyst support plate. There exists therefore an upper limit for the surface area of the support plate when the catalyst support plate is only supported along its edges. Proceeding above this upper limit would demand an impractical or uneconomical reinforcement of the catalyst support plate for instance the use of a very thick catalyst support plate.

An alternative method of supporting the catalyst support plate is by using various supporting structures placed in the catalyst bed and fixed on the catalyst support plate. This allows the use of larger catalyst support plates in comparison to fixing the support plate to the catalyst housing walls. Supporting structures such as stays fixed on the catalyst support plate can be used. Stays are supportive elements fixed at one end to a first structure and at its other end to a second structure, providing support to one or both of the structures.

However, stays and such similar supporting structures can have differences in thermal expansion due to unequal temperature distribution in the reactor. This causes high stress effects within the catalyst support plate and in the stays in the axial direction, and this can lead to their deformation or rupture. The forces experienced by these particular reactor internals in the radial direction are negligible compared to the forces in the axial direction.

The English abstract of JP patent application No. 49010172 discloses a catalytic reaction apparatus useful in high temperature catalytic reactions for avoiding rupture of the catalyst supporting plate. The catalyst supporting plate has holes and is partitioned into one or more regions and a supporter for the catalyst-supporting plate. Both are fastened with vertical bolts. The thermal expansion of the catalyst supporting plate can be absorbed by loosening the bolts between the plate and its supporter so that they can slide relative to each other.

This application describes a catalytic reaction apparatus in which the stresses in the catalyst supporting plate are reduced in the radial direction only. There is no mention of how to reduce the stresses in the axial direction. It is therefore an objective of the invention to provide a catalytic reactor in which thermal stresses on the reactor internals in the axial direction are reduced. This in turn reduces deformation and rupture of the reactor internals.

BRIEF SUMMARY OF THE INVENTION

The invention comprises a catalytic reactor having reactor internals which include a segmented catalytic support plate supported by elongated support elements, in which the stresses experienced by the reactor internals at higher temperatures are reduced in the axial direction.

The invention comprises a catalytic reactor having the characteristics described in claim 1.

DETAILED DESCRIPTION OF THE INVENTION

Figure 1:
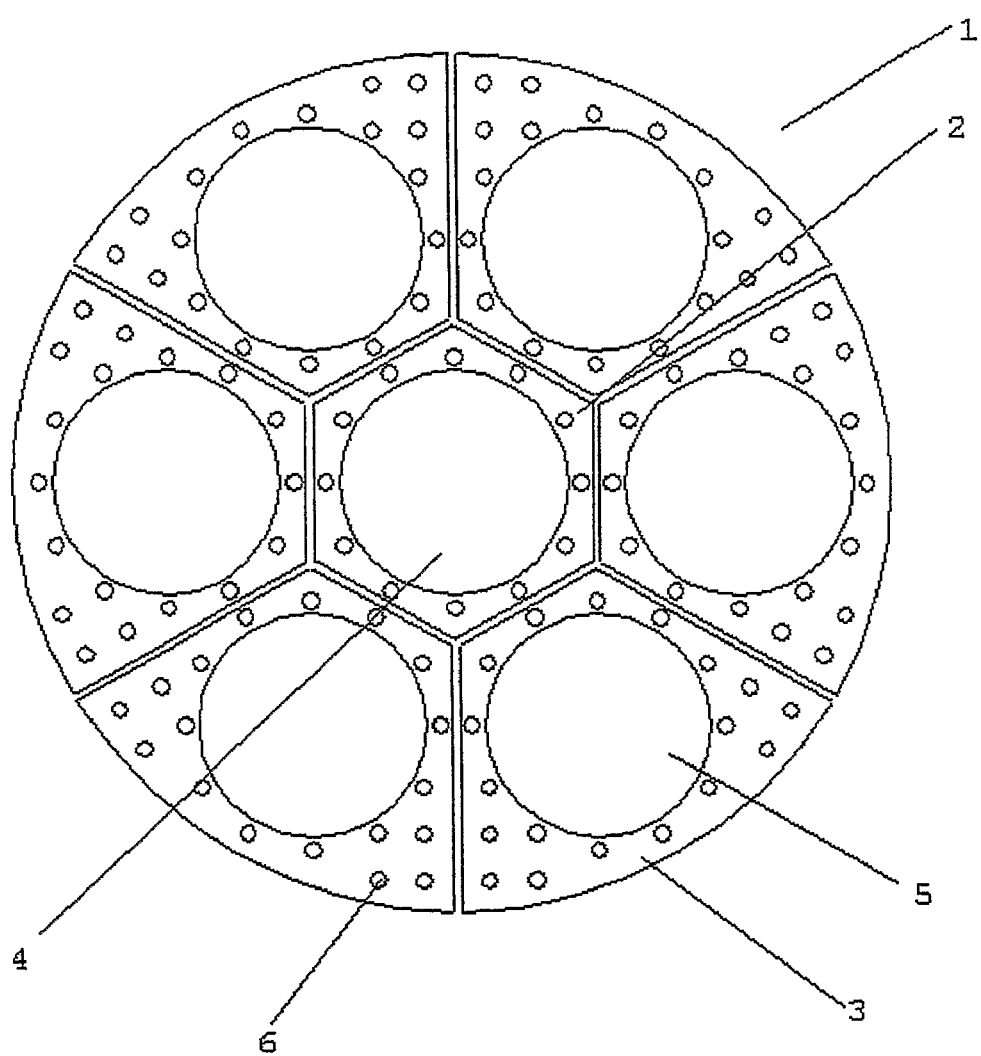
FIGS. 1, 2 and 3 are schematic diagrams showing transverse sections of the segmented catalyst support plate in three different embodiments of the invention.

The catalytic reactor of the invention includes a catalyst housing comprising a plurality of elongated support elements. Within the catalyst housing is a perforated catalyst support plate for supporting a bed of catalyst particles. The elongated support elements are, at their lower ends, fixed to the perforated catalyst support plate, for instance by means of welding. The perforated catalyst support plate is segmented and each catalyst support plate segment is supported by an elongated support element. The assembly consisting of segmented catalyst support plate and elongated support elements fixed on these catalyst support plate segments are supported by a tube sheet or plate onto which the upper ends of the elongated support elements are fixed.

The catalytic bed is positioned on the upper surface of the perforated catalyst support plate. Catalyst particles thus surround the outer surface of the elongated support elements. Process gas entering the catalytic reactor is directed towards the catalytic bed for reaction. The perforations in the catalyst support plate allow the reacted process gas to flow through both the catalyst bed and the catalyst support plate to the lower side of the catalyst support plate.

The segmented catalyst support plate can for instance be prepared by cutting a single, large, catalyst support plate having the required dimensions suitable for the reactor apparatus into smaller individual catalyst support plate segments. The catalyst support plate can be cut using, for instance, water jet cutting or any other suitable method known in the art. Perforations can be made in the catalyst support plate segments or the large catalyst support plate can already be perforated before cutting it into individual segments.

The catalyst support plate segments can have any suitable shape or combination of shapes which can be placed in the reaction apparatus to form a surface on which the catalyst bed can be positioned. The catalyst support plate segments can for instance be three-sided (triangular), four-sided, five-sided or six-sided.

The catalyst support plate segments can be placed beside each other edge to edge, with or without a gap between the plate segments. If a gap is present then it is important that the catalyst particles are prevented from falling through the aperture into the volume below the catalyst support plate.

In order to avoid this situation, the minimum thickness of each catalyst support plate segment should be, under all process, start-up and shut-down conditions, at least equal to the largest possible difference in extension between two neighbouring elongated support elements.

The segmented catalyst support plate can be made of any suitable material. Examples are nickel alloys and stainless steel.

The elongated support elements can have a transverse cross-section that is cylindrical. Other cross-sectional shapes are also possible, e.g. a hexagonal or square cross-section. In other words, the transverse cross-section can be polygonal in shape.

The catalytic reactor of the invention is suitable for use at a wide range of temperatures. It is particularly suitable for use at temperatures above 700° C. in reactors, where the stays can experience a large variation in temperatures leading to significant variations in thermal expansion.

Each catalyst support plate segment is attached to at least one elongated support element. However, catalyst support plate segments bordering the wall of the catalyst housing can optionally be fixed to this wall while the remaining catalyst support plate segments are attached to the lower ends of the elongated support elements.

An embodiment of the invention is a catalytic reactor in which the elongated support elements are stays onto which the catalyst support plate segments are attached.

Another embodiment of the invention is the catalytic reactor in which the elongated support elements are tubes e.g. heat transfer tubes onto which the catalyst support plate segments are attached.

Yet an embodiment of the invention is the catalytic reactor in which the elongated support elements onto which the catalyst support plate segments are attached are concentric double tubes e.g. with catalyst inside the inner tube. The annular volume, that is the annulus, is the concentric double tubes, provides a channel that can for instance be useful in the transfer of process gas.

The invention and its embodiments are described in more detail in the following:

FIG. 1 is a schematic diagram showing a transverse section of a segmented catalyst support plate 1. In this embodiment, the catalyst support plate 1 is cut into several segments consisting of a central catalyst support plate segment 2 and peripheral catalyst support plate segments 3 that are correspondingly supported by a centrally placed elongated support element placed in the hole 4 and peripheral elongated support elements placed in hole 5. Each catalyst support plate segment has perforations 6 that provide even distribution of the process gas through both the catalyst bed and the catalyst support plate segments. In this embodiment the catalyst support plate segments 2 and 3 are respectively four and six sided.

Figure 2:
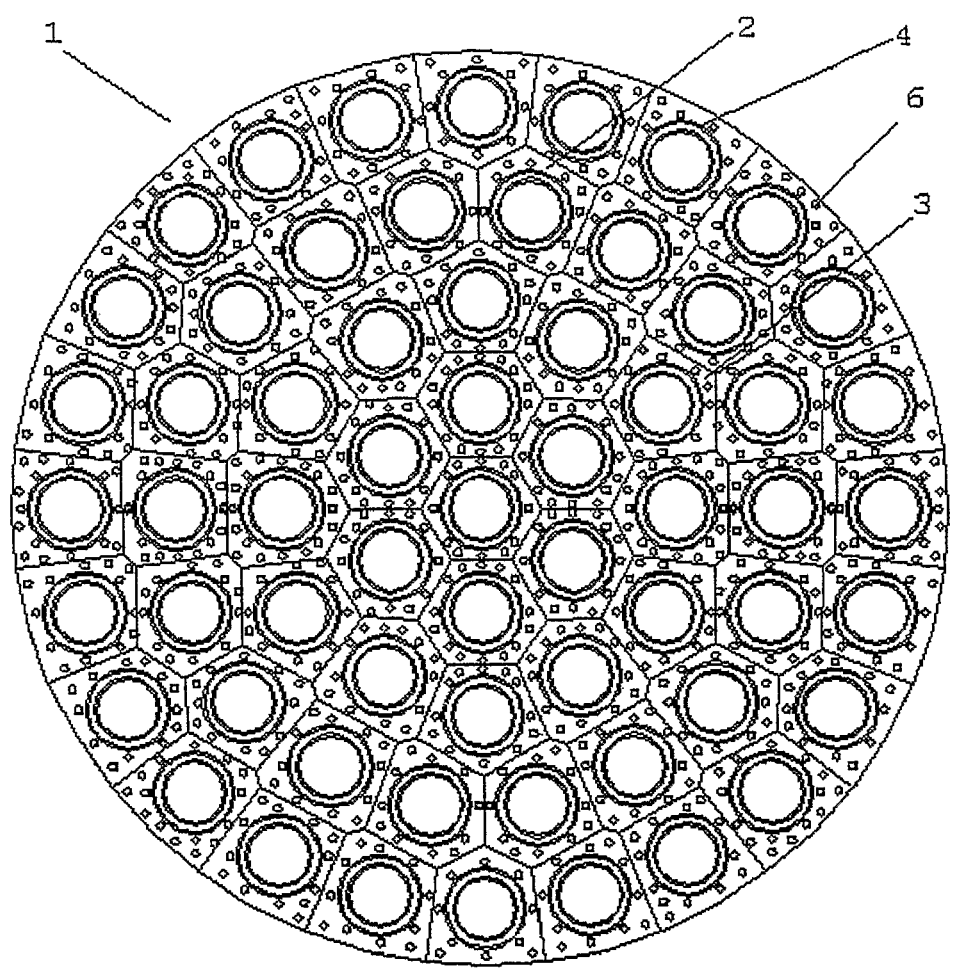

However, each catalytic support plate segment can be cut in different shapes as illustrated in FIG. 2. FIG. 2 shows a transverse section through a catalyst housing in a catalytic reactor of the invention comprising a plurality of elongated support elements 4 fixed to a plurality of catalyst support plate segments 2 and 3 with perforations 6. This embodiment shows catalyst support plate segments 2 and 3 that are respectively hexagonal and pentagonal in shape, and the length of the sides of the catalyst support plate segments can vary i.e. they are not identical in length, as shown in catalyst support plate segment 2. Catalyst support plate segments that are triangular or square in shape are also useful in the catalytic reactor of the invention. The catalyst support plate segments 2 can therefore be polygonal in shape. In this embodiment the elongated support elements are cylindrical and consist of concentric double tubes.

Figure 3:
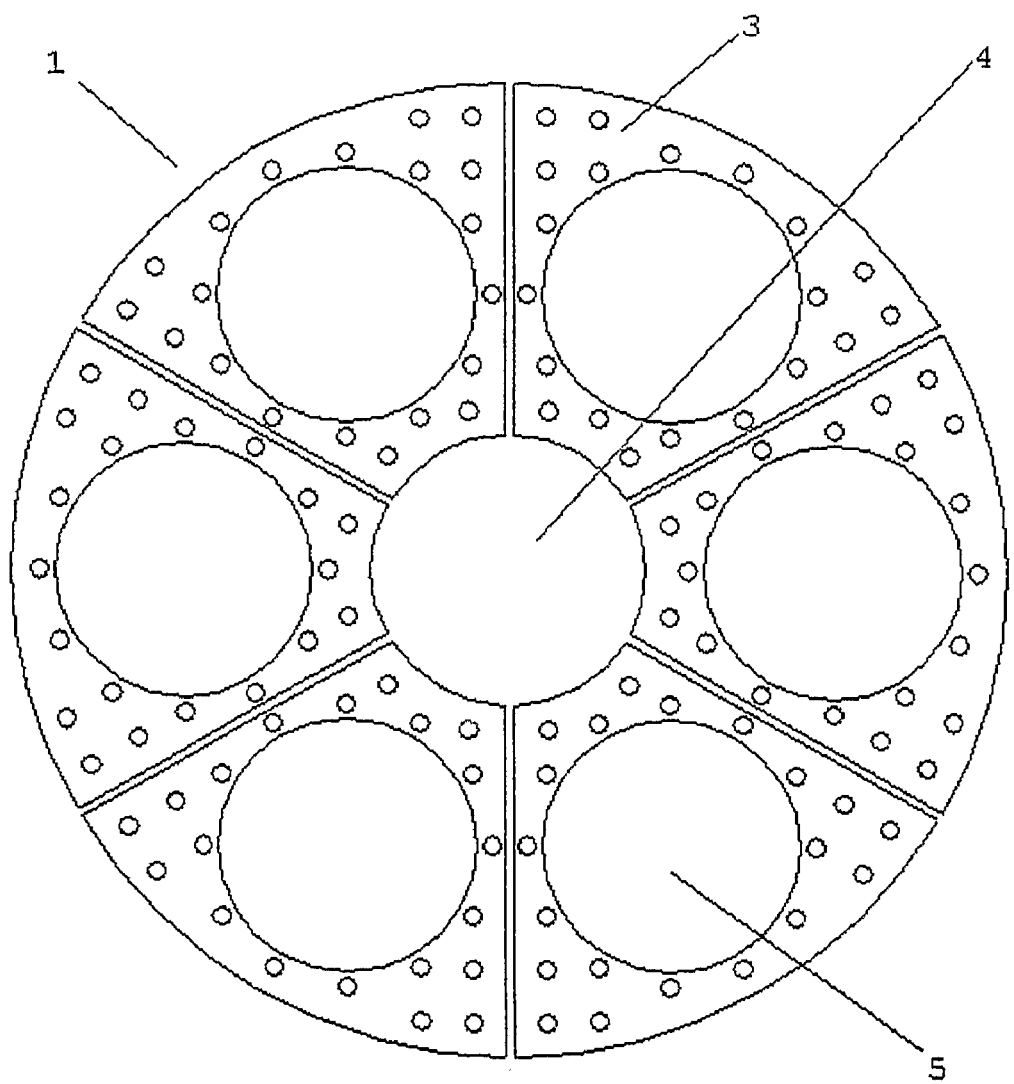

FIG. 3 shows a variation of the embodiment shown in FIG. 1. In this embodiment, the central catalyst support plate segment is eliminated and the peripheral catalyst support plate segments 3 are cut such that they border the central elongated element placed in hole 4. In this case, the central elongated element in hole 4 does not support any of the catalyst support plate segments 3.

All the catalyst support plate segments are supported. However not all the elongated elements in the catalyst bed provide support to a catalyst support plate segment. The number of the elongated support elements can vary in accordance with the size of the reactor, but will mostly be in the range 1 to 1000. Elongated elements not providing support could be tubes for transport of fluids.

In practice the temperature differences experienced across the total surface of the catalyst support plate segments can vary widely. However, the local temperature differences between neighbouring elongated support elements are not large. This means that the expansion experienced locally by neighbouring elongated support elements is very similar. Any elongated support elements therefore expand by approximately the same length as its nearest neighbours.

Figure 4:
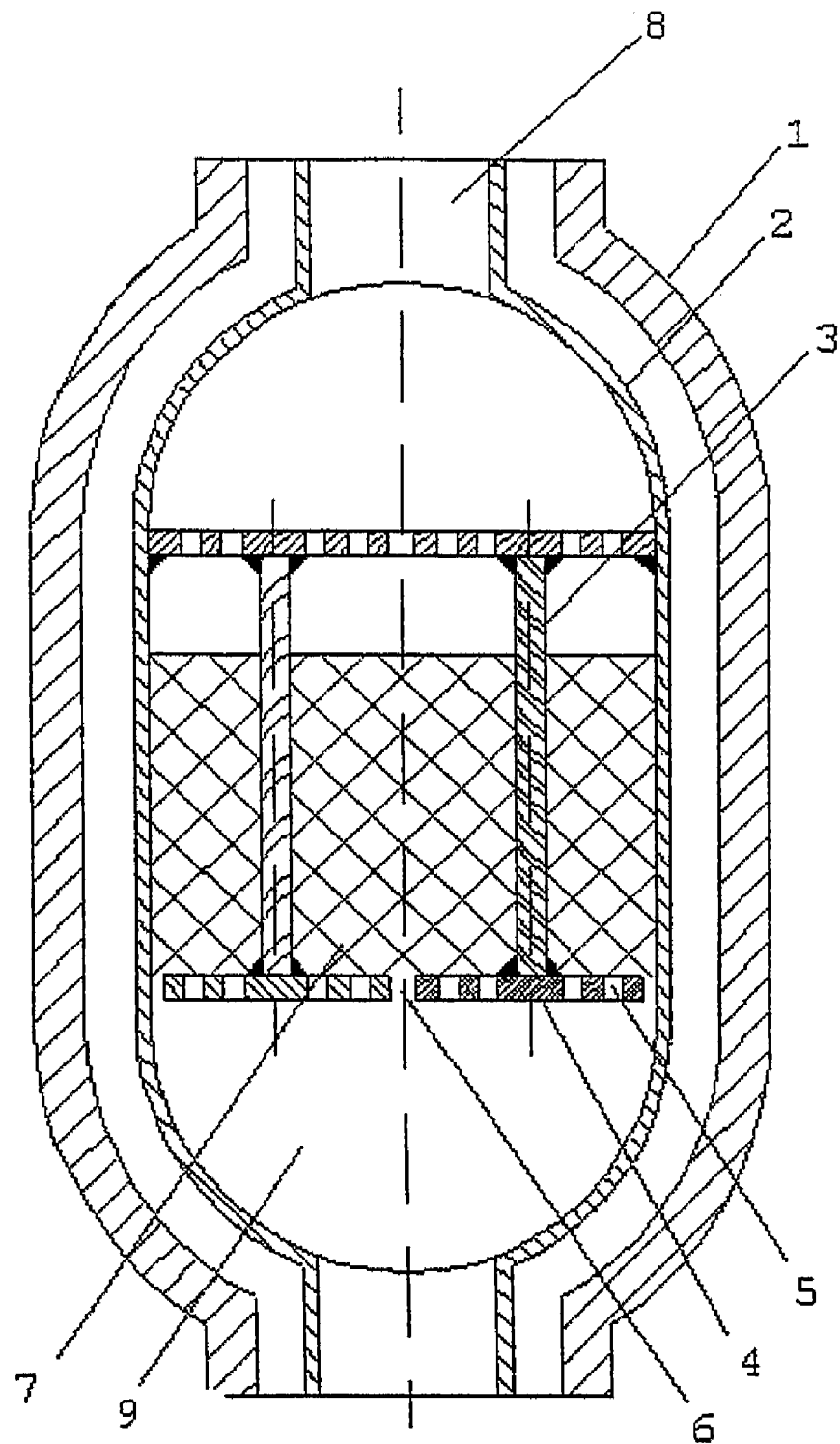
FIG. 4 is a schematic diagram showing a longitudinal section through the catalyst housing with stays fixed at their lower ends to the segmented catalyst support plate.

Another embodiment of the invention is shown in FIG. 4. FIG. 4 shows a longitudinal section through a catalytic reactor 1 of the invention. The catalytic reactor 1 includes a catalyst housing 2 and a plurality of stays 3 which are arrayed inside the housing 2. Two stays 3 are shown. Each stay 3 supports a catalyst support plate segment 4 at the lower end of the stay. The plate segments 4 have perforations 5 and are placed edge to edge with or without a gap 6 between the edges of the plate segments 4.

The plate segments 4 thus form a surface similar to that of a single large catalyst support plate suitable for supporting the catalyst bed 7.

Process gas enters the catalyst housing 2 through the inlet 8, and passes through the catalyst bed 7 for catalytic reaction at the required temperature. After catalytic reaction the process gas passes through the perforations 5 and the gaps 6, if present, to enter the volume 9 downstream the catalyst bed 7.

Figure 5:
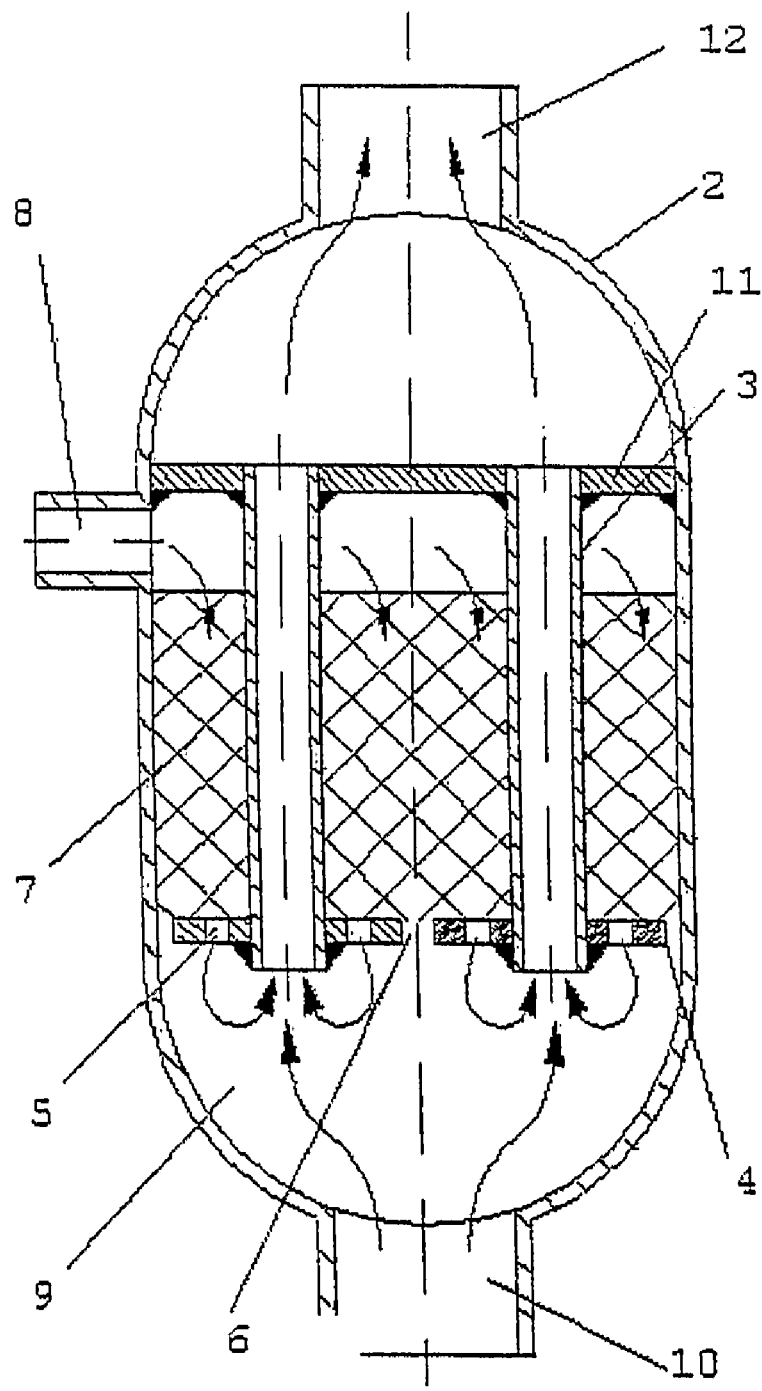
FIG. 5 is a schematic diagram showing a longitudinal section through the catalyst housing with tubes fixed at their lower ends to the segmented catalyst support plate.

Another embodiment of the invention is shown in FIG. 5. In this embodiment the catalytic reactor of the invention is similar to that described in FIG. 4 with the exception that the elongated support elements are tubes 3 through which a process fluid can flow with the lower ends of the tubes being fixed to the catalyst support plate segments 4. Only the catalyst housing and its contents are shown in this figure. A process fluid enters the catalyst housing 2 through the inlet 8 and is converted during passage through the catalyst bed 7. After passage through plate segments 4 the reacted process gas enters the volume 9 and thereafter the tubes 3 through their lower ends. During passage through the tubes 3 the reacted process gas can be in indirect heat exchange with the reacting process gas in the catalyst bed 7.

This embodiment is suitable for use in a steam reforming reaction in which methane is reacted with steam to produce carbon monoxide and hydrogen. The endothermic steam reforming reaction takes place in the catalyst bed 7, and the product gas enters volume 9 and is mixed with hot gas entering from inlet 10. The mixture is thereafter, during transfer through the tubes 3, cooled by heat exchange with the reaction occurring in catalyst bed 7. The reacted gas leaves the catalyst housing 2 through the outlet 12.

The embodiment shown in FIG. 5 is particularly useful in steam reforming reactions where temperatures as high as 1000° C. are experienced. In such reactors a reactor tube, which can be twelve meters in length, can experience an expansion in length of, for instance, 160 millimetres at this temperature, depending on the coefficient of thermal expansion of the tube metal. Since the reactor tube is fixed at its upper end to the tube sheet 11, the expansion is largest at its lower end.

An unequal temperature distribution in the reactor can lead to a variation in the expansion of each individual reactor tube in the reactor. Ultimately this will result in deformation and rupture of the catalyst support plate if it is not segmented. When the segmented catalyst support plate is used, it allows differential expansion of the reactor tubes without rupture of any of the internals.

Figure 6:
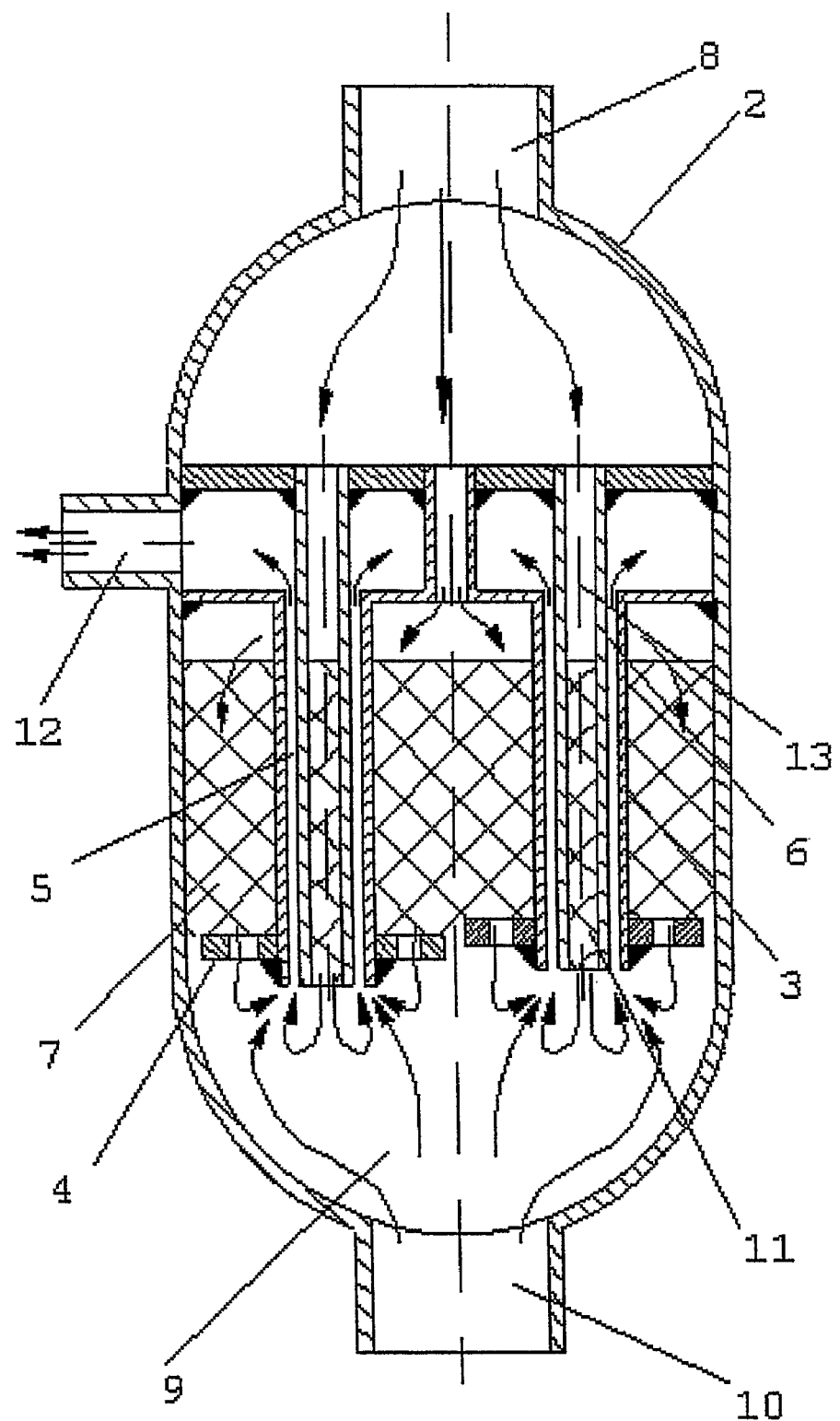
FIG. 6 is a schematic diagram showing a longitudinal section through the catalyst housing with double tubes fixed at their lower ends to the segmented catalyst support plate.

A further embodiment of the invention is shown in FIG. 6. Only the catalyst housing and its contents are shown in this figure. In this embodiment the catalytic reactor of the invention is similar to that described in FIG. 5 with the exception that the elongated support elements are concentric double tubes 3 with their outer tube fixed at their lower ends to the catalyst support plate segments 4. A process fluid can flow in the annulus 5 of the concentric double tubes 3 and the volume of the inner tube 6 can be filled with catalyst particles. The segmented catalyst support plates 4 support the catalytic bed 7 outside the concentric double tubes 3.

FIG. 6 is explained in more detail in the following. A process fluid, for instance process gas, enters the catalyst housing 2 through the inlet 8 and is converted during passage through the additional catalyst bed 11 located in the volume 13 of the inner tube 6 of the concentric double tube 3. The process gas is simultaneously converted during passage through catalyst bed 7 located outside the concentric double tubes 3. The converted process gas leaves the volume 13 of the inner tube 6 of the concentric double tube 3 and enters the volume 9. The converted process gas also leaves the catalyst bed 7 through the perforated segmented catalyst support plate 4 and enters the volume 9. The converted process gas in volume 9 can then be mixed with another gas entering catalyst housing 2 through inlet 10. The process gas mixture is thereafter transferred through the annulus 5 of the concentric double tubes 3 to the outlet 12.

Figure 7:
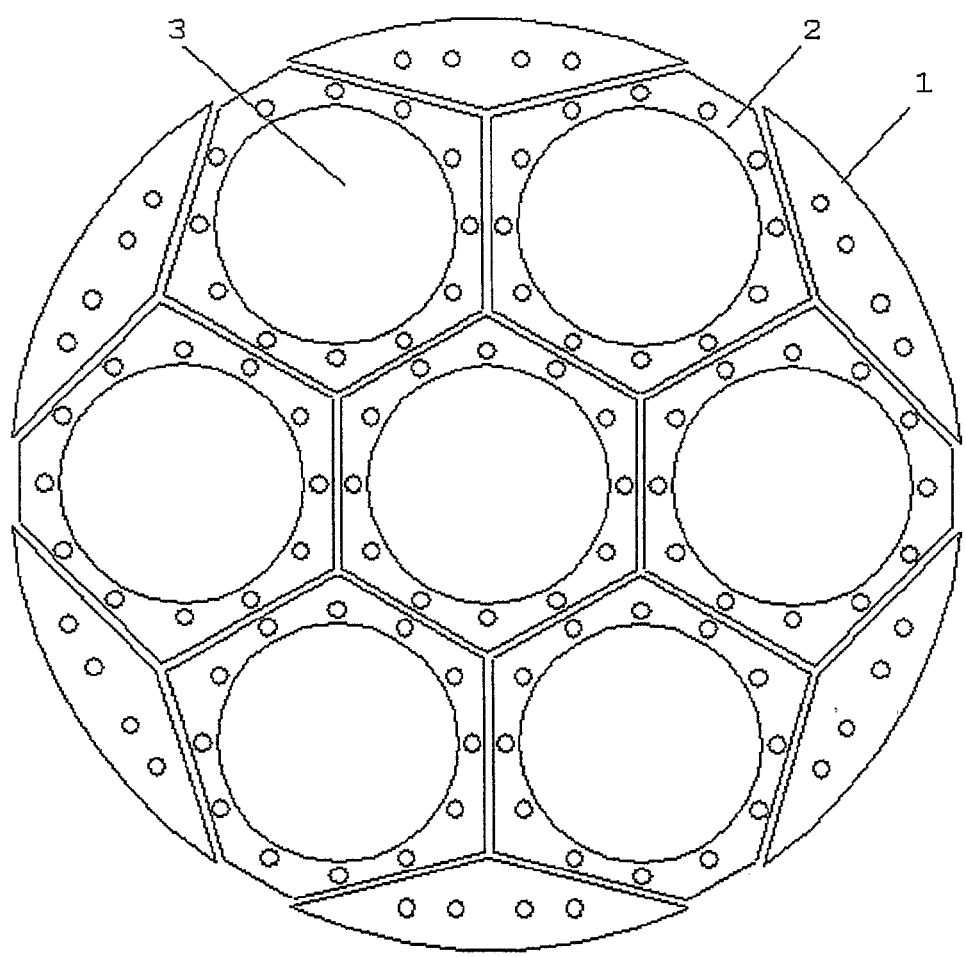
FIG. 7 is a schematic diagram showing a transverse section of the segmented catalyst support plate with segments attached either to the catalyst housing wall or to the elongated support elements.

Another preferable embodiment of the invention is the catalytic reactor in which the catalyst support plate segments are fixed to either an elongated support element or to the vertical wall of the catalyst housing as shown in FIG. 7. In this embodiment some of the catalyst support plate segments 1 bordering the vertical wall of the catalyst housing are fixed to and supported by the vertical wall. The remaining catalyst support plate segments 2 are fixed to and supported by elongated support elements placed in the hole 3.

The invention claimed is:

1. Reactor for a catalytic conversion reaction comprising within a catalyst housing a perforated catalyst support plate supporting a catalyst bed, the catalyst support plate being supported by a plurality of elongated support elements, the catalyst particles in the catalyst bed being placed outside the elongated support elements, the perforated catalyst support plate being attached to the lower ends of the elongated support elements, the perforated catalyst support plate being divided into a plurality of perforated catalyst support plate segments, at least one perforated catalyst support plate segment being supported by an elongated support element.

2. Reactor according to claim 1 wherein at least one further catalyst support plate segment bordering the wall of the catalyst housing is supported by this wall.

3. Reactor according to claim 1 wherein the elongated support elements have a cylindrical or polygonal cross section.

4. Reactor according to claim 1, wherein the elongated support elements are stays, tubes or concentric double tubes.

5. Reactor according to claim 4, wherein the tubes are heat transfer tubes.

6. Reactor according to claim 4, wherein the concentric double tubes contain catalyst inside the inner tube and process gas in the annulus.

7. Reactor according to claim 1, wherein the catalyst support plate segments are polygonal in shape.

8. Use of the reactor according to claim 1 in a steam reforming reaction comprising the step of endothermic steam reforming of methane and steam in the catalyst bed.

* * * * *